UNITED STATES PATENT OFFICE.

THOMAS A. EDISON, OF NEWARK, NEW JERSEY, ASSIGNOR TO HIMSELF AND GEORGE HARRINGTON, OF WASHINGTON, D. C.

IMPROVEMENT IN CHEMICAL TELEGRAPHY.

Specification forming part of Letters Patent No. 166,860, dated August 17, 1875; application filed July 25, 1874.

CASE No. 89.

*To all whom it may concern:*

Be it known that I, THOMAS A. EDISON, of Newark, in the county of Essex and State of New Jersey, have invented an Improvement in Chemical Telegraphs, of which the following is a specification:

The object of this invention is to record dots and dashes upon chemically-prepared paper by electro-decomposition for telegraphic purposes.

The invention consists in combining the sesquichloride of iron with the ferrocyanide of potassium, and using a stylus of tin, which is connected to the copper pole of the battery.

The action is as follows: Nascent oxygen evolved at the point of the tin stylus combines with the stylus to form the protoxide of tin, which is a powerful reducing agent. This reduces the sesquisalt of iron to a protosalt of iron, and the ferrocyanide of potassium combines to form a precipitate of Prussian blue. The reaction is very delicate. Chloride of ammonium or sodium increases the delicacy.

I claim as my invention—

The combination of a sesquisalt of iron with the ferrocyanide of potassium, and a tin stylus, for the purpose set forth.

Signed by me this 1st day of June, A. D. 1874.

THOS. E. EDISON.

Witnesses:
GEO. T. PINCKNEY,
CHAS. H. SMITH.